United States Patent [19]
Henschel et al.

[11] Patent Number: 5,793,173
[45] Date of Patent: Aug. 11, 1998

[54] ACTUATION DEVICE FOR MOTOR VEHICLE PARTS WHICH ARE MOVABLE BY AN ELECTRIC MOTOR

[75] Inventors: Ulrich Henschel; Claus Vordermaier, both of München, Germany

[73] Assignee: Webasto Karosseriesysteme GmbH, Stockdorf, Germany

[21] Appl. No.: 668,812

[22] Filed: Jun. 24, 1996

[30] Foreign Application Priority Data

Jun. 26, 1995 [DE] Germany ............... 195 23 210.0

[51] Int. Cl.$^6$ ................................................ H02H 7/08
[52] U.S. Cl. ...................... 318/467; 318/286; 318/466; 318/569
[58] Field of Search ............................ 318/466, 468, 318/467, 285, 286, 266, 434, 469, 569, 280; 388/903, 909; 49/139, 348, 349, 280, 501

[56] References Cited

U.S. PATENT DOCUMENTS

| | | | |
|---|---|---|---|
| 5,250,882 | 10/1993 | Odoi et al. | 318/467 |
| 5,521,474 | 5/1996 | Hahn | 318/285 |
| 5,539,290 | 7/1996 | Lu et al. | 318/469 |

FOREIGN PATENT DOCUMENTS 42 29 439 A1  3/1994  Germany .

*Primary Examiner*—John W. Cabeca
*Attorney, Agent, or Firm*—Sixbey, Friedman, Leedom & Ferguson; David S. Safran

[57] ABSTRACT

An actuation device for motor vehicle parts that are movable by an electric motor, in particular for window regulators and sliding roofs that are driven by a reversible electric motor. This actuation device has a setpoint value device for the desired position of the movable part, an incremental actual-value device for producing a signal corresponding to the actual position of the movable part, an absolute actual value device which emits first and second signals that are positionally fixed relative to the incremental actual-value device, and a microprocessor to compare the setpoint and actual value signals and to perform control and regulation programs. The signal emitted by the absolute actual-value device changes only at predetermined position values and the absolute actual-value device has position zones which are separated from one another by these position values that can be predetermined. The first and last position zones are each defined by a first or second end position of the movable part. The absolute actual-value device has at least five separate position zones and emits the first signal in the first and last position zone, and the first and last position zone are wider than all other position zones in which the absolute actual value device emits the first signal.

10 Claims, 2 Drawing Sheets

ACTUATION DEVICE FOR MOTOR VEHICLE PARTS WHICH ARE MOVABLE BY AN ELECTRIC MOTOR

BACKGROUND OF THE INVENTION

1. Field of the Invention

The invention relates to an actuation device for motor vehicle parts which are movable by an electric motor. In particular, the invention relates to an actuation device for window regulators and sliding roofs, and other parts that are driven by a reversible electric motor and which is provided with a setpoint device for the desired position of the movable part, with an incremental actual-value device for the actual position of the movable part, with an absolute actual-value device to emit first and second signals that are set relative to the incremental actual-value device, and with a microprocessor to compare the setpoint and actual values and to perform control and regulating programs, where the signal emitted by the absolute actual-value device changes in each case only at predetermined position values and the absolute actual-value device has position ranges that are separated from one another, in each case, by these predetermined position values, and where the first and last position range is defined in each case by a first or second end position of the movable part.

2. Description of Related Art

An actuation device of the type to which the present invention is directed is known from published German Patent Application NO. 42 29 439. This device makes it possible, in each case, to perform a renewed calibration in the area of the mechanical end stop by the fact that the absolute actual-value device causes a signal change at a certain, predetermined distance from the respective end stop. In this way, running of the setpoint value and the actual value of the position into one another in an uncontrolled way, as can be triggered, for example, after a power failure or by counting errors of the incremental actual-value device caused by electromagnetic disturbances, is prevented so that the movable part does not travel beyond the allowable range and, for example, press against a mechanical stop in a way that causes it to be damaged or nonfunctional.

Further, the absolute actual-value device emits another signal change at a designated position, which is generally the closed position of the sliding roof. This signal change is used, during normal operation, as a reference for actual calibration of the counter for the position of the movable part, while both remaining signal changes are used mainly to protect against damage. Overall, this known device has four position ranges, and the signal of the absolute actual-value device differs in the end position ranges.

A drawback of the device from German Patent Application NO. 42 29 439 is that, if there is a loss of the correct position update, no selective approach to the home position is possible, since recognition of the mistaken calibration is always possible only by the signal change of the absolute actual-value device that occurs upon reaching the closed position. But, a selective approach to the closed position is significant, in practice, for safety reasons, comfort reasons, and for reasons of handling mechanical components in a careful way. Thus, generally, when closing and opening the roof, a slowing of the roof movement is desirable near the closed position.

SUMMARY OF THE INVENTION

The primary object of the present invention is to provide an actuation device for motor vehicle parts which are movable by an electric motor that offers reliable protection of the movable part before approaching mechanical stops and guarantees selective approach to designated positions as comprehensively and reliably as possible.

This object is achieved by an actuation device, particularly one for sliding roofs, in which the absolute actual-value device has at least five separate position ranges, the absolute actual-value device emits the first signal in each case in the first and last position range, and the first and last position range have a larger width than all other position ranges in which the absolute actual-value device emits the first signal. Here, the term "sliding roof" is to be understood generally, i.e., as including sliding-lifting roofs, spoiler roofs and lifting roofs with one or more covers or cover parts, as well as folding roofs or combinations of such roofs.

In the device according to the invention there is thus, in contrast to the device known from the above-mentioned German Application No. 42 29 439, at least one additional position range, and the end ranges exhibit the same signal of the absolute actual-value device and can be clearly differentiated from the additional ranges with the same signal because of their larger width. This makes it possible to have reliable position calibration in each edge area, and thus, protection of the movable part in the area of the end stop. The additional ranges create additional calibration possibilities near other designated positions.

To each position range there is suitably allocated a predetermined number of counting pulses of the incremental actual-value device. The number of pulses in the corresponding ranges can be tied to tolerances in practice. For example, a relatively narrow range can be 3 to 5 pulses wide, while a relatively wide range can be 9 to 11 pulses wide.

In another advantageous configuration of the invention, there are five position ranges, and the home position of the movable part lies within the third position range, the home position of the movable part being, preferably, the closed position of the sliding roof or a predetermined intermediate position of a window pane, and is at a fixed distance from the second or third position value in the form of a predetermined number of counting pulses of the incremental counter.

This configuration makes it possible to recalibrate the position counter, not only in the edge area or right in the home position, but also at a predeterminable distance before reaching or after leaving the home position. This means that a position-dependent choice of movement speed is guaranteed near the closed position, even if there is a previous loss of absolute position information.

The actual-value devices are configured, preferably, so that the incremental actual-value device consists of a magnet ring that has multipole magnetization in the axial direction, to which at least one magnet sensor is allocated. More specifically, the absolute actual-value device is comprised of a magnet ring that is magnetized axially forming at least two segments in the circumferential direction and with unipolar magnetization. A magnet sensor is arranged relative to the magnet ring so as to indicate, by a signal, the designated positions of the movable part or a fixed distance to it.

This embodiment represents a reliable, simple and cost-effective signal detection unit.

These and further objects, features and advantages of the present invention will become apparent from the following description when taken in connection with the accompanying drawings which, for purposes of illustration only, show several embodiments in accordance with the present invention.

3

DETAILED DESCRIPTION OF THE PREFERRED EMBODIMENT

Figure 1:
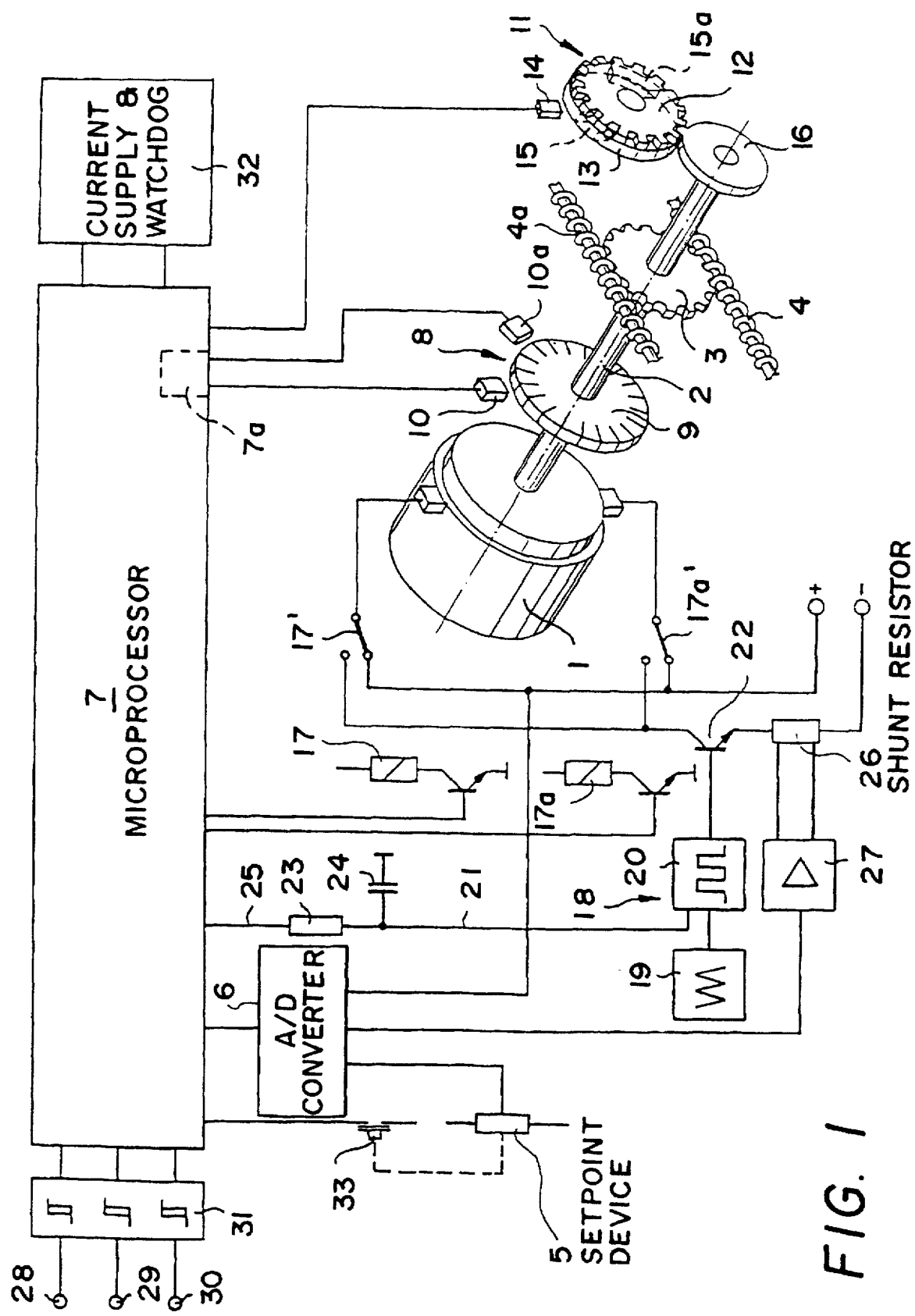
FIG. 1 is a schematic diagram of an actuation device with the electromechanical driving parts in accordance with a preferred embodiment of the present invention.

In FIG. 1, an electric motor 1 is shown that acts on a shaft 2 via a worm gear (not shown). A pinion 3 is fixed to shaft 2 so as to turn with the shaft. Pinion 3 engages in two coiled cables 4, 4a that are resistant to compression-tension, so-called helix cables. Sliding roofs, which currently are embodied predominantly as spoiler roofs or sliding-lifting roofs, are driven mainly by such helix cables. The window regulators in a car door often act by a cable barrel and a flat cable on the movable part. But, for further consideration it makes no difference as to the means by which power is transferred to the movable part.

For better clarity the movable part, i.e., the roof cover, connected to cables 4, 4a, is not represented in FIG. 1. It is characteristic for a sliding-lifting roof that the closed position of the cover is not at an end position of helix cables 4, 4a, but is at an intermediate position that is not secured by any mechanical indexing, being indicated only by the stopping of motor 1 in a position that is to be maintained precisely. The end positions of the helix cables 4, 4a correspond, on the one hand, to an open position of the cover in which it is slid back under the fixed roof surface, and on the other hand, a fully lifted position of the cover in which it is pivoted upward so that the rear edge of the cover is raised above the fixed roof surface.

The setpoint value of the sliding-roof movement can be preselected at a setpoint device 5 made, in this embodiment, as a potentiometer. The analog voltage detected there during the preselection is conveyed by an A/D converter 6 to a microprocessor 7, which compares the digitized setpoint value to a digital actual value that is derived from the position of the sliding roof, and microprocessor 7 stops the motor 1 when the difference between predetermined setpoint value and position-dependent actual value becomes zero.

Figure 3:
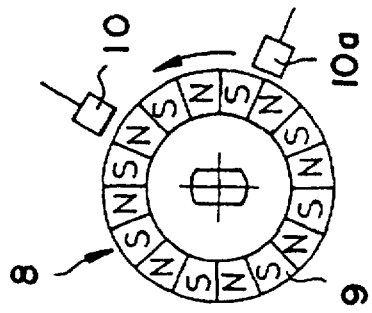
FIGS. 3 & 4 are diagrammatic views of the incremental and absolute actual-value pulse generators, respectively, of the actuation device shown in FIG. 1.

This actual value is provided by an incremental actual-value device 8, that has a magnet ring 9 with, e.g., 20 magnetic poles (FIG. 3). Magnet ring 9 turns with shaft 2 and generates pulses in magnet sensors 10 and 10a that are conveyed to the microprocessor 7 and counted there by a counting register 7a. Sensors 10 and 10a are arranged with shifted phases relative to one another and thus emit phase-shifted pulses from whose shifting direction the data about the turning direction of motor 1 is derived in a known way.

Consequently, over the entire movement path of the movable part, incremental actual-value device 8 emits a predetermined number of pulses, from whose number the respective position of the sliding roof can automatically be recognized, in particular both end positions (open position and raised position) and the closed position lying between them.

As already mentioned above, this information about the actual position of the movable part, for example, a sliding roof, relying purely on counting pulses, is not reliable in practice because counting errors can occur in the microprocessor that can add up over time to deviations that can no longer be tolerated.

This deficiency is eliminated here because, in addition to incremental actual-value device 8, another absolute actual-value device 11 is provided that provides to microprocessor 7, at certain positions of the movable part, absolute information about the position that has been reached and that can reset counting register 7a of the processor. In this embodiment, this absolute information is attainment of each of the predetermined end positions and the closed position.

Figure 4:
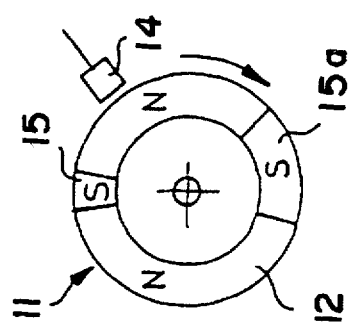

Absolute-value device 11 is comprised of a magnet ring 13 that is placed on a toothed wheel 12 and with which a magnet sensor 14 interacts. Magnet ring 13 has two pole zones 15 and 15a on its circumference, while the remaining part of its circumference is either of opposite polarity (as shown in FIG. 4) or is not magnetized. Toothed wheel 12 is driven by an axial gear or a single-tooth gear 16 that is turned by shaft 2. Here, the arrangement shown in FIG. 1 is purely diagrammatic in order to better be able to represent the function. In the actual device, this gear 16 can be designed completely differently.

To reach the position determined by setpoint value device 5, the turning direction of the motor can be suitably controlled by two relays 17 and 17a and by their changeover contacts 17' or 17a'. Depending on the kinematics of the sliding-lifting roof, it can be difficult to precisely to obtain a selected position of the cover by the control loop without overshooting. The interrelationship between the rotation angle of shaft 1 and the cover position is strongly nonlinear in the lifting area. The friction and wind forces, as well as varying onboard system voltage, influence the behavior of the control loop. Thus, it is advantageous to adapt the motor speed to the displacement program without steps with a pulse-width modulation by processor 7. Thus, e.g., the movement into the closed position can be performed at a greatly slowed speed, to be able to react in time to a possible correction of the count, before overshooting the closed position. A gentle motor startup avoids stressing of the mechanical parts and the onboard system voltage.

A pulse width modulator 18 provided for this speed adaptation is comprised of a delta generator 19 and a comparator 20, which compares the delta voltage with an analog voltage supplied by processor 7 on a line 21 and produces a square-wave voltage based on the comparison result, and a transistor 22 which is located in the supply circuit of electric motor 1.

By changing the analog voltage on line 21, the average voltage acting on motor 1 can be adjusted. Since processors generally do not have analog outputs, the analog output can be generated by averaging a square-wave voltage at a processor input 25 using downstream integrating components 23 and 24. In this representation, all necessary aids, such as trip-free mechanisms, suppressor circuits, etc. have been omitted.

To measure the motor current, a shunt resistor 26 is connected in series to the collector-emitter path of transistor 22, and since the motor current flows through this shunt resistor 26 only in the on-phases of transistor 22, a sample-hold circuit 27 is connected to resistor 26. From the current flow, the rate of speed, and the battery voltage, processor 7 can decide if an object is caught in the path of movement or if the movable part is moving with difficulty.

At control inputs 28, 29, 30 there are applied, for example, a signal from the ignition lock, to get the whole device ready, a signal from the central locking system automatically to close the movable part, and a signal from the tachometer automatically to close the movable part above a threshold speed. The processing software can be selected to produce almost any particular mode of operation. Other signals from the vehicle can be included in the functions. A suppressor circuit 31 protects the processor 7 from surges and unwanted signals from the vehicle cable harness. A current supply and a so-called watchdog for the processor are indicated as block 32.

It has proven practical to activate certain optional functions with a pushbutton 33 combined with potentiometer 5. Thus, here, for example, the central locking system can be disabled to be purposely keep the roof a little open despite automatic door locking.

Figure 2:
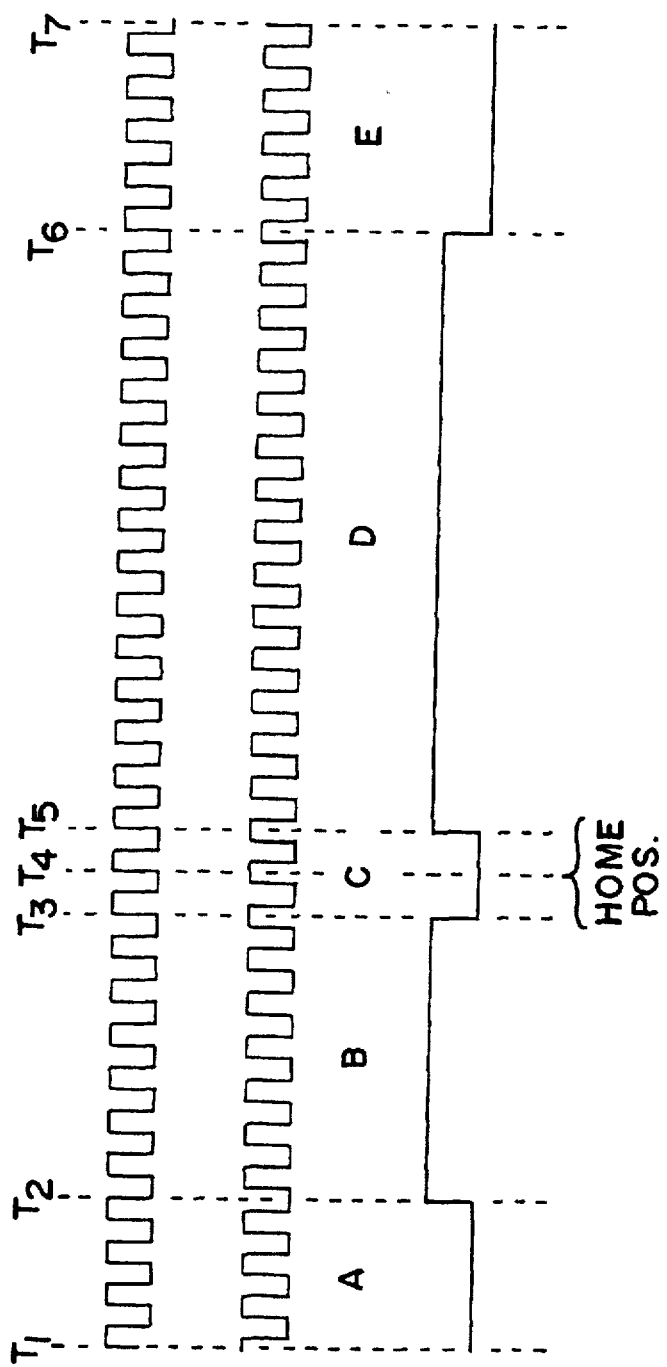
FIG. 2 diagrammatically depicts the pulses emitted by the incremental and absolute actual-value pulse generating devices of FIGS. 3 & 4.

FIG. 2 shows an advantageous allocation of the signals of the incremental and absolute actual-value device relative to one another. On top is represented incremental actual-value device 8, formed of the multipole magnetized magnet ring 9 and both magnet sensors 10, 10a, which, when magnet ring 9 turns in the direction of the arrow in FIG. 3, emit the top two illustrated series of pulses, electrically offset by 90 degrees, which clearly make it possible to close in the turning direction. On the bottom in FIG. 2 is represented the absolute actual-value device 11, formed of magnetic ring 13 with relatively narrow, magnetized pole segment 15 with opposite polarity and magnetic sensor 14.

In this embodiment, the absolute actual-value device 11 is made so that five position ranges designated A, B, C, D, and E can be differentiated. Range C, extending symmetrically around the home, e.g., closed position, here, is allocated to the relatively narrow pole segment 15, while end position ranges A and E are allocated to wider pole segment 15a, which has a magnetization of the same polarity as segment 15. The zones of the magnetic ring 13 lying in between segments 15, 15a, have a magnetization of opposite polarity.

FIG. 2 represents the course of the signal in five position ranges A, B, C, D, and E of absolute actual-value device 11, and end position ranges A and E are each defined by an end position $T_1$ and $T_7$. The position ranges are separated from one another by position values $T_2$, $T_3$, $T_5$ and $T_6$. Position $T_4$ designates the home, e.g., closed, position of the movable part.

If absolute actual-value device 11 moves out of home position range C into range B (the magnet ring will have started clockwise in the direction of the arrow in FIG. 4, i.e., moving the pulses of FIG. 2 to the right), then the counter can be recalibrated when, a rising flank is passed (position $T_3$ when moving from zone C to zone B) or it can be initialized at the first startup, eliminating any adjusting work. With continued movement, the change in the signal of absolute actual-value device 11 causes, at the border with end position range A (position $T_2$), the calibration, i.e., the count predetermined by incremental actual-value device 8, to again be checked. At this moment, it cannot yet be finally decided if position $T_2$ or $T_5$ has been passed, since, during clockwise turning, both positions appear as descending flanks. But, if the actual count coincides within certain error boundaries either with the absolute position of $T_2$ or $T_5$, it is advantageous that control then begin, that the actual position be exactly $T_2$ or $T_5$, and that the counter then be calibrated to this value. Preferably, when the descending flank is passed over, it causes the control to lower the motor speed, as described above, since it is desirable, generally, to slow movement of the movable part when approaching the closed position and when approaching either of the end positions. The positions $T_2$ and $T_5$ can, finally, be differentiated based on whether, after passing over the descending flank, a rising flank (that corresponds to $T_3$) appears or not. At this point, the final calibration is then performed. If, first, a position at $T_2$ has been assumed in error, although $T_5$ was involved, then this error is recognized when, in moving from $T_5$ toward $T_3$, the flank at $T_3$ is passed, so that the control can operate motor 1 to shift the movable part back into the closed position, if the closed of the roof was originally desired.

If complete certainty in recognizing the position is desired, then the control is to be embodied so that even when, during a clockwise turning, after passing over a descending flank, $T_5$ is decided upon and the roof is to be closed, the motor first is moved further at least along the path from $T_5$ to $T_3$ (and thus the home position $T_4$ is passed over up to position $T_3$) to verify the original assumption and only then moves back into the home position. But in practice, generally, also leaving out this verification (i.e., no additional passing over home position $T_4$), still guarantees a sufficient reliability since only in the case when accidentally a deviation in calibration from about $T_5$ to $T_2$ occurs is position $T_2$ instead of $T_5$ mistakenly assumed. Thus, damage to the roof by an unintentionally colliding with a mechanical stop is precluded in any case, since end position range A is wider than home position range C.

Up to now the system behavior has been described for the case when the absolute actual-value device turns clockwise in the direction of the arrow shown in FIG. 4, moving the pulses to the right relative to FIG. 2. But, when it turns counterclockwise/to the left i.e., when it moves to end position $T_7$, the above description applies just the same.

Since, by automatically resetting the counter, permanent errors can be avoided, the counting can be simplified by using only one magnet sensor, e.g., 10, and assuming the counting direction corresponding to the relay control.

Instead of, or in addition to, the closed position of the roof, by providing other segments on magnet ring 13 of absolute actual-value device 11, other designated positions of the roof, such as, e.g., a half-open or half-pushed out position of the roof can be accurately obtained, in a similar way to that described above, just as the closed position, i.e., a recalibration near this position is possible from both sides. These segments must be magnetized with the same polarity as the end position zones and must differ in their widths, so that they each can be clearly recognized by the control. Of course, optionally, also the zones magnetized with opposite polarity can be correspondingly evaluated.

Magnetic rings 9 and 13 of actual-value device 8 or 11 can also be designed so that the zones between the segments are not magnetized. Further, magnetic rings 9 and 13 can also be magnetized radially rather than axially.

While several embodiments in accordance with the present invention have described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Actuation device for motor vehicle parts which are movable by a reversible electric motor, comprising a setpoint value device for setting a setpoint value which corresponds to a desired position of a movable part, an first actual-value means for producing an actual value signal which corresponds to the actual position of the movable part at each of a series of incremental positions along a path of movement of the movable part, a second actual-value means for emitting a first signal and a second signal which are positionally fixed relative to the signal of the first actual-value means and which change only at predetermined positions which separate predetermined position zones, a first and last position of which correspond to a first and second end position of the movable part and between which an intermediate zone containing a home position for return movement of the movable part from said end positions is located, and a microprocessor means for comparing the setpoint value and the actual value signal and for performing control and regulation programs wherein:

the second actual-value means has at least five separate position zones;

the second actual-value means emits said first signal in each of a first and last of said position zones and said intermediate position zone; and said first and last position zones have a broader width than said intermediate position zone.

2. Actuation device according to claim 1, wherein said first actual-value means comprises a counter for producing a respective predetermined number of counter pulses for each of said position zones.

3. Actuation device according to claim 1, wherein said first and second end positions of the movable part are one of completely pivoted-out and completely opened positions of a sliding-lifting roof.

4. Actuation device according to claim 2, wherein a third of the five position zones corresponds to said intermediate zone containing the home position of the movable part.

5. Actuation device according to claim 3, wherein a third of the five position zones corresponds to said intermediate zone containing the home position of the movable part, said home position of the movable part being a closed position of the sliding-lifting roof.

6. Actuation device according to claim 4, wherein the microprocessor comprises means for checking and recalibrating the actual value signal of the first actual-value means after every signal change of the second actual-value means in dependence upon the actual value at which the signal change appears and whether, after a predetermined number of counter pulses of the counter of the first actual-value means which corresponds to the size of the third position zone, a renewed signal change occurs, causing the turning direction of motor to be taken into account.

7. Actuation device according to claim 4, wherein the home position has a fixed distance from a second or third position value in the form of a predetermined number of counter pulses of the counter of the first actual-value means.

8. Actuation device according to claim 1, wherein the first actual-value means comprises a magnetic ring with multi-pole magnetization in an axial direction and at least one magnetic sensor positioned in sensing proximity to said magnetic ring; and wherein the second actual-value means comprises an axially magnetized ring with at least two segments which are magnetized with the same polarity and are spaced from each other in a circumferential direction of the magnetized ring, and an additional magnetic sensor positioned in sensing proximity to said magnetized ring for producing a position signal which represents designated positions of the movable part.

9. Actuation device according to claim 1, wherein a motor control means for gradually starting the drive motor and for adjusting its speed in step-free manner is provided, said motor control means comprising a transistor regulator and a pulse width modulator.

10. Actuation device according to claim 1, wherein said movable part is a sliding cover of a vehicle roof.

* * * * *